United States Patent
Ebey et al.

(10) Patent No.: US 9,864,401 B2
(45) Date of Patent: Jan. 9, 2018

(54) MULTIPLE DISPLAYS FOR A PORTABLE ELECTRONIC DEVICE AND A METHOD OF USE

(71) Applicant: Village Green Technologies, LLC, Mountain View, CA (US)

(72) Inventors: Tina Ebey, Mountain View, CA (US); Peter B. Bishop, Washington, DC (US)

(73) Assignee: Village Green Technologies, LLC, Mountain View, CA (US)

( * ) Notice: Subject to any disclaimer, the term of this patent is extended or adjusted under 35 U.S.C. 154(b) by 164 days.

(21) Appl. No.: 14/589,853

(22) Filed: Jan. 5, 2015

(65) Prior Publication Data

US 2015/0116188 A1 Apr. 30, 2015

Related U.S. Application Data (63) Continuation of application No. 12/829,262, filed on Jul. 1, 2010, now Pat. No. 8,928,551.

(60) Provisional application No. 61/223,653, filed on Jul. 7, 2009.

(51) Int. Cl.
| | |
|---|---|
| *G06F 1/16* | (2006.01) |
| *G06F 3/147* | (2006.01) |
| *G06F 1/32* | (2006.01) |
| *G06F 3/14* | (2006.01) |

(52) U.S. Cl.
CPC .......... *G06F 1/1616* (2013.01); *G06F 1/1624* (2013.01); *G06F 1/1647* (2013.01); *G06F 1/3265* (2013.01); *G06F 1/3287* (2013.01); *G06F 3/1423* (2013.01); *G06F 3/1431* (2013.01); *Y02B 60/1242* (2013.01); *Y02B 60/1278* (2013.01); *Y02B 60/1282* (2013.01)

(58) Field of Classification Search
CPC ........ G06F 1/19; G06F 1/1616; G06F 1/1624; G06F 1/1647; G06F 1/3265; G06F 1/3287; G06F 3/1423; G06F 3/1431; G06K 9/00; G09G 5/00; H04M 1/00; Y02B 60/1278; Y02B 60/1242; Y02B 60/1282
USPC .................. 345/715, 156; 455/566; 382/128; 361/680
See application file for complete search history.

(56) References Cited

U.S. PATENT DOCUMENTS

| | | | |
|---|---|---|---|
| 4,159,417 | A | 6/1979 | Rubincam |
| 5,534,888 | A | 7/1996 | Lebby et al. |
| 6,343,006 | B1 | 1/2002 | Moscovitch et al. |
| 6,643,124 | B1 | 11/2003 | Wilk |
| 6,717,589 | B1 * | 4/2004 | Grillo .................. G06F 9/4446 715/711 |
| D496,362 | S | 9/2004 | Ozolins et al. |

(Continued)

*Primary Examiner* — Julie Anne Watko
(74) *Attorney, Agent, or Firm* — Brundidge & Stanger, P.C.

(57) ABSTRACT

A multiple display system having at least two mechanical arrangements such that in one of the at least two arrangements one of the multiple displays is stowed, out of the way mechanically and visually, when only a first display is in use; and one of the other of the at least two arrangements wherein the other of the multiple displays is substantially coplanar and adjacent to the one screen when both screens are in use. The other display in the one of the other of the at least two arrangements also runs the graphical user interface of an application, permitting the multiple display system to offer at least two programs running simultaneously, each with its own visual user-interface operating on its own display.

20 Claims, 5 Drawing Sheets

(56) References Cited

U.S. PATENT DOCUMENTS

| | | |
|---|---|---|
| 7,030,552 B2 | 4/2006 | Chao et al. |
| 7,075,597 B2 | 7/2006 | Wen et al. |
| 2001/0055983 A1* | 12/2001 | Ohmura ............... H04M 1/0202 455/566 |
| 2002/0010007 A1 | 1/2002 | Goodings et al. |
| 2004/0204126 A1* | 10/2004 | Reyes ................. H04M 1/0247 455/566 |
| 2006/0034042 A1* | 2/2006 | Hisano ................. G06F 1/1616 361/679.04 |
| 2007/0057909 A1* | 3/2007 | Schobben ............. H04R 1/028 345/156 |
| 2007/0064984 A1* | 3/2007 | Vassa .................... G06F 3/1454 382/128 |
| 2007/0216700 A1 | 9/2007 | Chen et al. |
| 2008/0062625 A1* | 3/2008 | Batio .................... G06F 1/1615 361/679.29 |
| 2009/0295731 A1* | 12/2009 | Kim ...................... G06F 1/1616 345/168 |
| 2010/0188350 A1* | 7/2010 | Sawada ............... H04M 1/0237 345/173 |
| 2011/0025625 A1 | 2/2011 | Hirako |
| 2011/0210922 A1 | 9/2011 | Griffin |
| 2011/0216064 A1* | 9/2011 | Dahl ..................... G06F 1/1616 345/428 |
| 2012/0084706 A1* | 4/2012 | Sirpal .................... G06F 1/1616 715/778 |
| 2012/0235949 A1* | 9/2012 | Ligtenberg ........... G06F 1/1616 345/174 |

* cited by examiner

MULTIPLE DISPLAYS FOR A PORTABLE ELECTRONIC DEVICE AND A METHOD OF USE

CROSS-REFERENCE TO RELATED APPLICATION

This application is a continuation and claims the benefit of priority to U.S. patent application Ser. No. 12/829,262, filed on Jul. 1, 2010, entitled "MULTIPLE DISPLAYS FOR A PORTABLE ELECTRONIC DEVICE AND A METHOD OF USE", which claims benefit under 35 USC 119(e) of U.S. Provisional Patent Application Ser. No. 61/223,653, filed Jul. 7, 2009, all of which are incorporated herein by reference in their entireties.

FIELD OF THE INVENTION

The present invention relates generally to portable electronic devices and more particularly to multiple displays for such a device.

BACKGROUND OF THE INVENTION

A range of electronic devices use display screens. Such devices include desktop computers, laptop computers, handheld computers, cell phones, PDAs, music players, video players, video games, portable email devices, GPSs, cameras, barcode scanners, as well as a variety of industrial and commercial special-purpose devices. Typically, portable devices use flat-panel displays, which are most commonly LCD (liquid crystal displays) but may also, be other technologies, including organic electroluminescent or organic LED, or other flat-screen technologies.

The majority of electronic devices currently in use have a single display. However, there are patents that describe electronic devices that utilize multiple displays. For example, Moscovitch (U.S. Pat. No. 6,343,006) teaches how to place multiple displays on base with supporting arms. However, Moscovitch does not teach how to have a second display that is hidden or protected, and Moscovitch does not teach how to use applications on the second display.

Wen (U.S. Pat. No. 7,075,597) teaches how to stack two LCD displays on top of one another. Wen does not teach how to have co-planer displays, both visible at the same time.

Chao (U.S. Pat. No. 7,030,552) teaches how to package two organic electroluminescent displays into one package, but does not teach how to create a movable second display, or how to automatically launch a second application.

Lebby (U.S. Pat. No. 5,534,888) teaches how to place two displays inside an enclosure, but not how to see only one display (the primary display) while hiding and protecting a secondary display. Nor does Lebby teach how to use applications effectively on multiple screens.

Ozolins (U.S. D496,362) teaches an ornamental design for two coplanar screens, but no means to hide or protect the second display when only a single display is required.

Rubincam (U.S. Pat. No. 41,159,417) teaches how to place the contents of a book on a removable memory device, but does not teach how to have only one display visible. Nor does Rubincam teach how to use applications other than for reading a book, magazine, and the like.

Lebby et al (U.S. Pat. No. 5,534,888) teaches how to make a book-like device using a pair of hollow bodies. However, Lebby does not teach how to hide a second display when not required, nor does Lebby teach how to automatically launch additional applications.

For many such devices, the size of the display is a major limitation in both the convenience value of the device as well as the number of applications that the device may realistically run, or display simultaneously.

In desktop computers, multiple displays are utilized in a variety of applications. Typically these displays are either (1) logically connected to provide a single, virtually contiguous display surface, or (2) are operated independently to provide multiple general-purpose display surfaces. In most cases each runs a "windows" graphical user interface, in which the user of the device may select any reasonable number of applications to display simultaneously.

However, for portable devices, with the general exception of laptop computers, no such similar capability exists to readily support two or more simultaneous applications due to the small physical size of the single display.

Therefore, having a second display available for use with portable electronic devices could make the device more capable and more valuable to the user. The downside of dual-displays, as taught in the literature, is that the second display is bulky and thus interferes with the convenience and portability of the device. Paying for the disadvantage of larger physical size when, frequently, only a single application is needed at one time has discouraged device manufacturers from offering dual-screen portable devices.

Accordingly, what is needed is a system and method to address the above-identified issues. The present invention addresses such a need.

SUMMARY OF THE INVENTION

A multiple display system having at least two mechanical arrangements such that in one of the at least two arrangements one of the multiple displays is stowed, out of the way mechanically and visually, when only a first display is in use; and one of the other of the at least two arrangements wherein the other of the multiple displays is substantially coplanar and adjacent to the one screen when both screens are in use. The other display in the one of the other of the at least two arrangements also runs the graphical user interface of an application, permitting the multiple display system to offer at least two programs running simultaneously, each with its own visual user-interface operating on its own display.

DETAILED DESCRIPTION

The present invention relates generally to electronic devices and more particularly to multiple displays for such a device. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides a second display on a portable device that can be utilized for a variety of purposes. This display is stowed when not in use, so as to add minimally to the physical size of the device. In addition, the display automatically turns on when deployed and off when stowed. As well, the display automatically launches a second, appropriate application when deployed. This saves the user from the difficulty of manually selecting and launching a frequently desired second application, while still using a first application.

Prior multiple displays have generally been treated, or it is assumed that the data on the additional displays was an extension of the data on the primary display. For example, in a windowed user environment, the user could extend any window on the primary display to cross the physical boundaries of the multiple displays. Or, alternatively, the user could manually open one or more separate windows on additional displays. However, in both cases the operating system or windows user interface managed the multiple displays as if they were either one large logically contiguous display, or two equal displays with comparable capabilities, but running under the control of the user-interface.

A key feature of the present invention is that a second display can run a second application, on a device that normally has only one visible application on the first display. In most cases the applications for portable devices have been optimized for a fixed display window size where the window size is equal to the display size. A system and method in accordance with the present invention takes advantage of this alternative optimization because each of the two running applications has a dedicated display of the desired size.

In addition, various methods are described for automatically launching and closing the second application in conjunction with the mechanical deployment of the second display. In a number of applications on the first display, certain actions of the user, such as selecting a name, message, or link, causes an appropriate second application to launch on the second display and to provide appropriate details about the item selected by the user on the first display.

To describe the features of the present invention in more detail, refer now to the following description in conjunction with the accompanying Figures.

Mechanical Apparatus

Figure 1A:
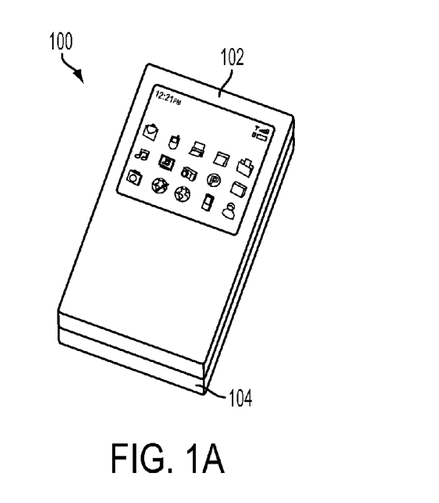
FIG. 1A illustrates a folding mode composite device where the screens are in a closed position.
Figure 1B:
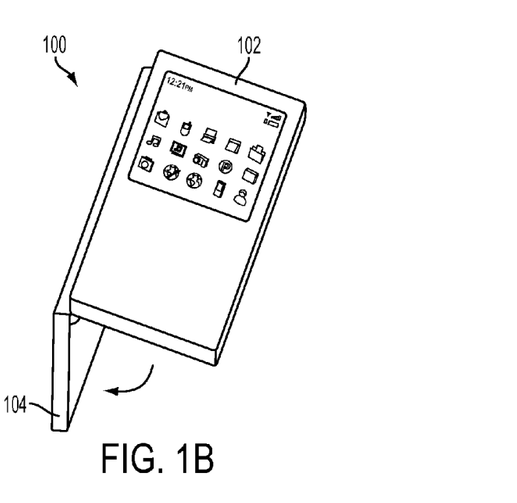
FIG. 1B shows a second screen of the folding mode composite device in the process of deployment, by folding the second display downward.
Figure 1C:
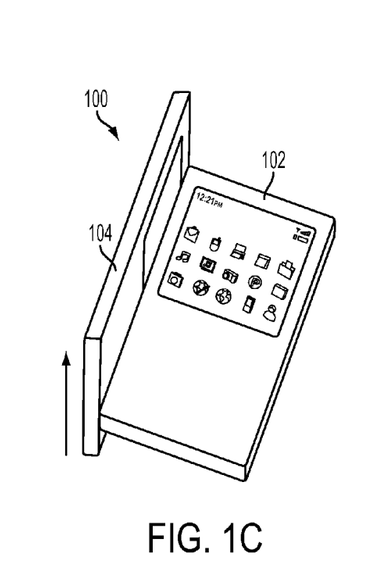
FIG. 1C shows the second display of the folding mode composite device in the further process of deployment.
Figure 1D:
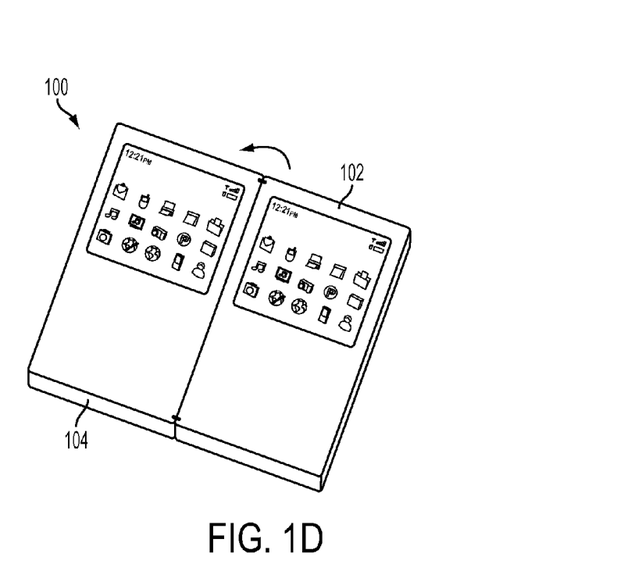
FIG. 1D shows the second display of the folding mode composite device fully deployed.

FIGS. 1A-1D illustrates a folding mode composite device 100. In FIG. 1A, the device 100 is closed. The optional display is powered down. In FIG. 1B, the optional display 104 in the process of deployment is shown by folding the second display 104 downward. The optional display 104 is still powered down. In FIG. 1C, the second display 104 is in the further process of deployment is shown by sliding the second display 104 upward. In FIG. 1D, the second display 104 is fully deployed by folding flat to be flush with the primary display 102. The second display turns on and shows content.

Figure 2A:
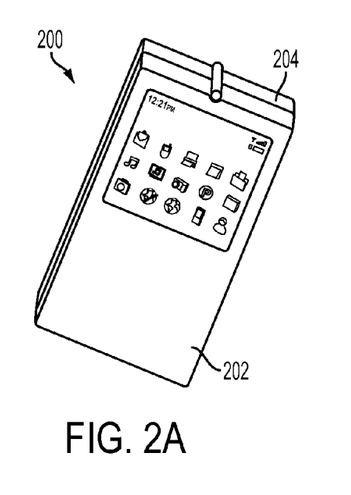
FIG. 2A illustrates a rotating mode composite device where the displays are in a closed position.
Figure 2B:
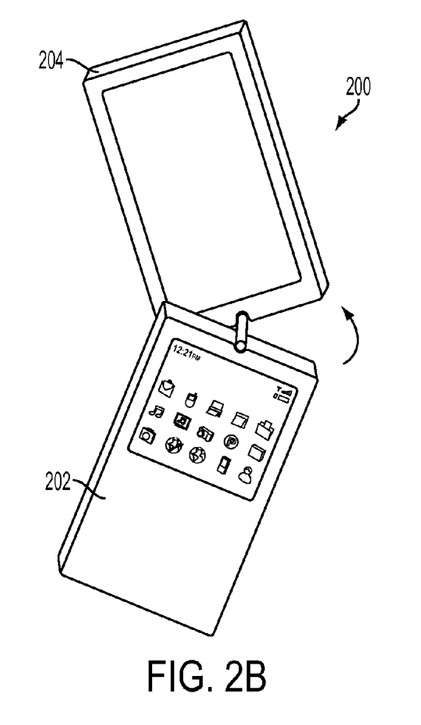
FIG. 2B shows a second display of the rotating mode composite device in the process of deployment.
Figure 2C:
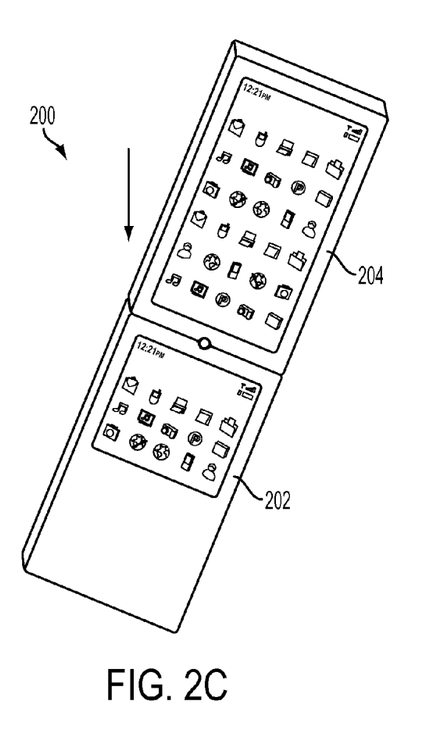
FIG. 2C shows the second display of the rotating mode composite device fully deployed.

FIGS. 2A-2C illustrates a rotating mode composite device 200. In FIG. 2A, the device 200 is closed. The optional display 204 is powered down. In FIG. 2B, the optional display 204 in the process of deployment is shown by rotating the displays 202 and 204 devices. In FIG. 2C, the second display 204 is fully deployed by rising upward, flush with the first display 202 and then snapping into position. The optional display 204 turns on and shows content.

Figures 3A, 3B, 3C:
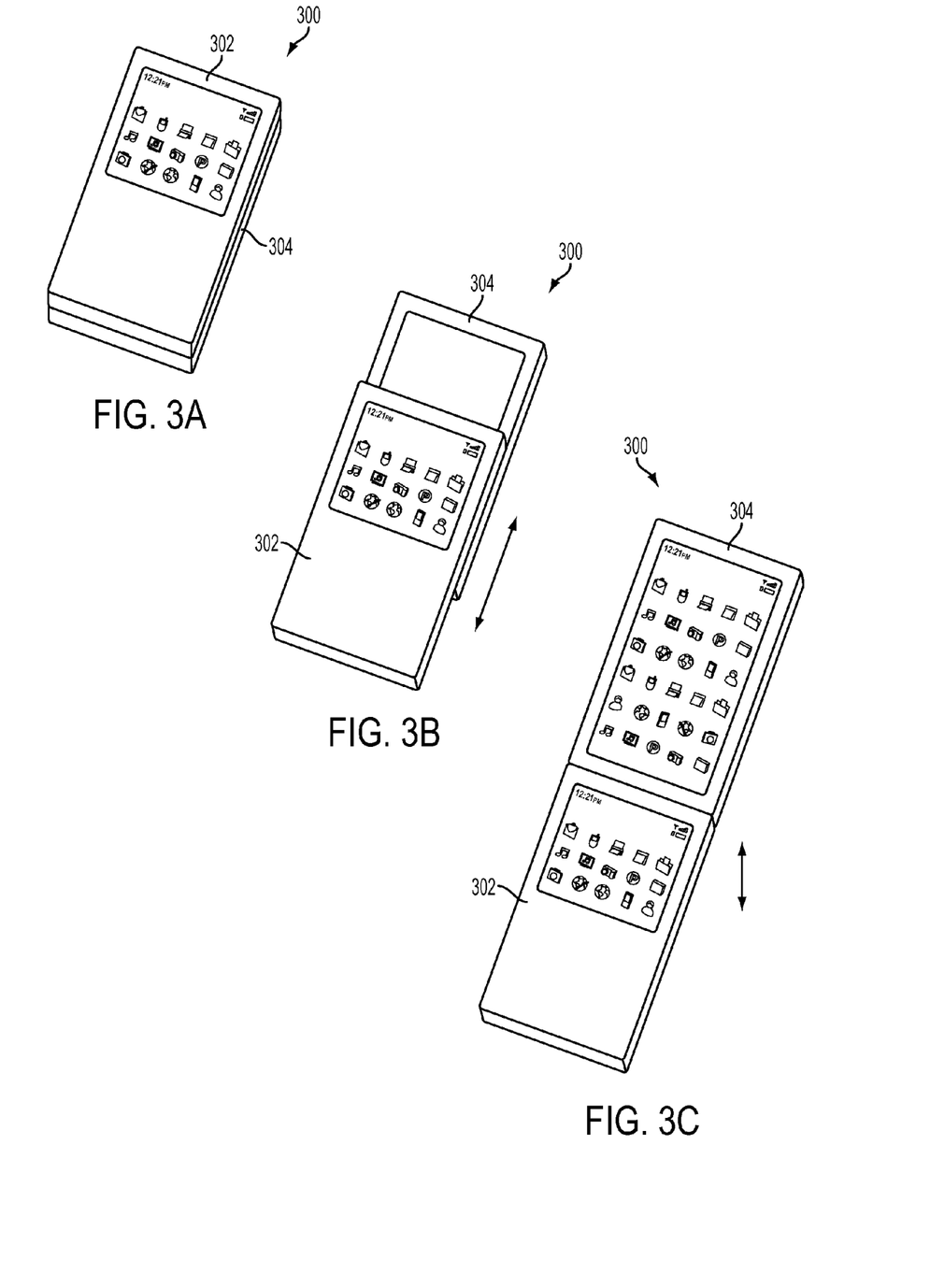
FIG. 3A illustrates a sliding mode composite device where the displays of the device are in a closed position.
FIG. 3B shows a second display of the sliding mode composite device in the process of deployment.
FIG. 3C shows the second screen of the sliding mode composite device fully deployed.

FIGS. 3A-3C illustrates a sliding mode composite device 300. In FIG. 3A, the device 300 is closed. The optional display 304 is powered down. In FIG. 3B, the optional display 304 is in the process of deployment by sliding upward. The optional display is powered down. In FIG. 3D, the optional display 304 is fully deployed by rising upwards, flush with the first display 302 and snapping into position. The second display turns on and displays content.

In each of the above embodiments, there are two mechanical methods in which the second display may be moved from its hidden, "stowed," position to its active, "deployed" position. The first method is for the user to physically move the second display. Typically user's hand or fingers, or a single finger, pushing, pulling, turning, or sliding the second display into the deployed position would accomplish this. Ideally the second display has two mechanical detents at the extreme ends of travel, one at the stowed position and one at the deployed position to hold the display securely in one of these two positions.

The second method is to have an automatic, or powered, mechanism to move the display. Such mechanisms are well known in the art, and include the use of springs and/or motors. Drive mechanisms could include a friction capstan, a belt, a screw driver, or other mechanisms. For this method, movement would be initiated by some mechanical or electronic action of the user, or by the device itself, according to preset options or preferences. For example, the user might touch an icon on the first screen with a finger or stylus. Alternatively, the user might select from a menu item to deploy or to stow the second display. Ideally, in most cases, the user indicating a desire to see more data about an item selected on the first display would deploy the second display.

A variation of the second method is to have an automatic deployment means that is powered by a spring that is "wound" by the user automatically as the user stows the second display each time. Thus, the mechanical action of rotating, sliding or folding the second display as it is put away "cocks" the spring, storing the necessary energy for later deployment. This variation allows the device to automatically move the second display into deployed position under electronic control. Mechanisms to release the stored energy in the spring causing the second display to deploy are well known, including devices such as solenoids and piezoelectric actuators.

Initiating Display Deployment

The term, "select," means one of several mechanisms for the user to select a piece of displayed information. Select mechanisms include but are not limited to a single tap, click or touch, a double tap, click or touch, a sliding motion, or combination of motions. This is not a comprehensive list of selection means. Items that might be selected include a word, a fragment of text, an icon, a photograph or image, a menu item, a location on a map, a location within an image, a position on a slider, or other virtual objects. The item selected could be a single item, a group of items, or multiple non-contiguous items. The item(s) selected could be still (stationary) on a display, or they could be moving on the display. Such movement might be caused by the use of Flash, video, scrolling, executing software or scripts, or other means. Selection mechanisms could also be time-based, or based on hearing something in an audio stream. Selection is typically a conscious action on the part of the user of the device, such as highlighting a specific word, name or link. However, selection may also be automatic. It could be based on the piece of information that is first, highest, largest, most prominent, or most important in the display. For example on a list of links on the primary display, the first link might open a web page for that link on the secondary display. Similarly, text on the primary display might have only a single link in the text, and this link would then open the corresponding web page on the secondary display.

As a second example, a name might appear first (or anywhere) on the primary display. Additional information about this person, product, place, event, company or product might then appear in the secondary display.

As a third example a complex word or term might appear in the text in the primary display. Additional information, such as a definition or a "help" screen might appear on the secondary display.

As a fourth example, a location might appear on a map in the primary display. This location might be the most important location on the map, or otherwise be known of interest to the user. Additional information about that location could appear on the secondary display. Such additional information might be, for example, directions to the location, other businesses near the location, a photograph of the location, or transportation information associated with the location.

Thus we see that while "selection" has traditionally referred to a specific action of the user, in this document we do not so limit the meaning of selection.

Ideally, an action that causes the second display to be deployed, such as selecting an item on the primary display, both causes the second display to be mechanically deployed, activated and illuminated, it also launches an appropriate second application for the second display, where this second application displays additional information about the selected item. However, the user may have to manually deploy the second display.

Usage of the terms, "second" and "secondary" in this document are largely interchangeable, as are the terms, "primary" and "first." Note, however, that because the two displays are ideally the same or nearly the same size, that, from the user's perspective, primary and secondary displays and applications could temporarily swap places. From the mechanical design of the device, however, the first or primary display is physically always the same display, and the second or secondary display is always the same display. When only one display is visible, that display is always the primary display. When one display is stowed, that display is always the secondary display.

Note, that it may be possible to build a device where the two displays may be physically removed from the device. It is also possible that the user or a technician could then swap the two displays, as if they were interchangeable spare parts.

In such a scenario, the functions of the primary and secondary displays have not changed, as the positions of the two displays in an operating device have not changed; only the physical hardware has been swapped, presumably for a maintenance or cosmetic purpose.

With either automatic or manual secondary display deployment, a key value of this invention is that a single action of the user, namely selecting an item on the first display, launches an appropriate application and directs that application what to show on the second display.

When we refer to a "second application," this includes a second display window managed by the same program or module that is displaying information on the first display. For example, the first display might show a list of emails the user has received. By selecting one email, that email is opened and its contents are displayed on the second window. The program running the second display might be the same program showing the list of emails on the first display, or it might be a second, different program.

However, a key feature of a system and method in accordance with the present invention is that the information shown on the first display is not "disrupted." What is meant by this is that first of all the image on the first screen is not covered up by a new window. For example, the most common situation currently is that opening a detail window causes some or all of the first display to be hidden "underneath" a new window. In a system and method in accordance with the present invention, the first display information is not covered, and is still usable. Secondly, we mean that the first display is not disrupted by making it smaller, or by "borrowing" a portion of the first display, or by re-arranging the contents of the first display to make room for the new information.

Disruption does not include minor changes in the first display that might indicate that the second display and/or second application is or is about to be available. Such indications might include, for example, changing the color of a link, or placing a box around an item. Another such example would be changing the nature of the "selection" indication.

Another feature of a system and method in accordance with the present invention is the ability to select an item on the second, deployed display to cause information to change on the first display. Thus, in a similar fashion to keeping the information on the first display while opening a new application or window on the second display, the user may open a third new application or window back on the first display, while keeping the information on the second display visible and active. For example, the first display might show a list of emails received by the user, while the second display shows the detail within one selected email. The user may then select a link (from the World Wide Web, or another Internet protocol link, a phone number, contact name, or song; as a few examples). This action would cause that link to open and show information relevant to the link on the first display.

The user could continue to select items, first on one display and then on the other. The invention would keep, in most cases, the "source" display visible at the same time the "target," or new display shows the most recently requested information.

Deployment Scenarios

One possible deployment scenario is for the user to mechanically deploy the second display, perhaps by sliding or rotating it from its stowed and protected position into its active position above the first display. As the display is being moved, or after it has reached its final detent position the display turns on. At approximately the same time the second application launches, based on the information shown or selected on the first display.

In this scenario the only action taken by the user of the device is the physical positioning of the display from stowed to deployed. Now the user can take advantage of the additional information and application interface on the second display.

A second possible deployment scenario is for the user to "double click" (or provide some other additional selection means) an item in the first display. The first display might show a dialog box asking the user to confirm the deployment of the second display. The user confirms the choice. The device then uses its automatic or motorized means to move the second display into position. From this point, progress continues as in the above scenario.

Other Mechanical Advantage

The arrangement of displays in this invention has an additional potential mechanical and economic advantage.

To explain this advantage, we first describe the mechanical situation in two common devices: a traditional clamshell laptop and a traditional hinged "flip-phone." Both of these devices provide a "closed" and an "open" position. Transport generally occurs in the closed position, and user operation generally occurs in the open position. Both devices have a keyboard on one half of the clamshell and the display on the other half. When the devices are closed, the keyboard and display face each other. When the devices are closed, the outside of the device consists of a relatively strong and resilient plastic or metal case. Generally, the closed position of the devices provides much more protection against impact, abrasion, scratches, liquids and other potential harms than the open position. This feature is desirable, as such physical risks and assaults on the device are expected to be more common during transport than during operation, when the user of the device is expected to exercise sufficient control to minimize the number and extent of potential harms.

Providing the protection of a case includes two elements. The first element is the thickness of the case. The second is the design of the device such that pressure or impact on the case is transmitted to relatively resilient parts of the internal apparatus of the device, such as a frame or perhaps a strong circuit board.

In a first implementation, the order of elements when the device is closed, from back to front are: (1) back case, (2) secondary display, (3) primary display. In front of the primary display might be a keyboard, electronics and a front case, but these elements are not part of this invention. When the device is closed, the three numbered elements above are either touching or in close physical proximity. As such these three layers provide a certain amount of mechanical strength and integrity against pressure, impact, and other possible, potentially damaging forces.

When the second display is deployed, there are several possible mechanical ordering of these elements. In one design scenario the back case is fixed relative to the primary display and the secondary display rotates or slides out from between the primary display and the back case. Thus, in the deployed mode, the secondary display lacks the protection from the back afforded by the back case of the device. Additionally, the back case lacks the physical support provided the relatively solid secondary display (which, although it might not be solid, is more resilient against deflection than air).

In addition, when the secondary display is in the deployed mode, the primary display also lacks the physical support of having the secondary display behind it.

Thus, the device, in aggregate, is considerably more rugged and less at risk to physical damage in the closed position or in the secondary display stowed position than it is in the secondary display deployed position. This situation is acceptable because use of the secondary display is expected to be less common than use of primary display. The user will tolerate a lower level of physical protection in exchange for the benefits of a second display.

Note, however, that in this scenario the second display does not need to be thick or as protected as the primary display. In exchange for the fact that the secondary display is not used as often as the primary display, the manufacturer may be able to save on weight and thickness by making the secondary display, its housing, or its supporting components, thinner than for the primary display. Similarly, the manufacturer may be able to make the back case lighter or thinner than they would for a single-display device because some of the time the device is in use the secondary display is located next to the back case providing some of the mechanical strength of the overall device.

A second possible mechanical scenario is that the back case is attached to the secondary display. So, when the secondary display is moved from the stowed to the deployed position, the back case moves with the secondary display. In this scenario, when the secondary display is in the deployed position the back of the primary display is relatively exposed.

However, in this scenario, like the first scenario, the manufacturer and the users may be willing to live with the reduced mechanical protection when the device has both displays deployed.

What is seen from both of these mechanical scenarios is that the overall negative mechanical impact in terms of weight, size and cost of the second display is likely to be less than the impact of the primary display. One should expect that the final size and cost of a two-display system is thus not twice the cost of a one-display system.

Alternatively, if a manufacturer decides to make the secondary display and its necessary housing the same thickness as the primary display and its housing, then the overall ruggedness of the device should be improved over the ruggedness of a single-display device because of the additional strength imparted to the device by the additional number of resilient layers in the final device.

Embodiments

FIG. 1 illustrates two display stacks. A ribbon/desktop is connected to screen 1, screen 2 and screen 3.

FIGS. 2a-2c illustrates display stacks in action. In FIG. 2a, the first application is opened. In FIG. 2b, the second application is opened. In FIG. 2c, the second screen is opened in the first application. In FIG. 2d, the second application is closed.

Figure 6:
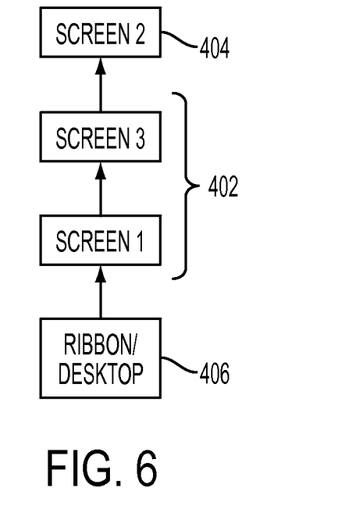
FIG. 6 illustrates an alternate display stack embodiment.

FIG. 6 illustrates an alternate display stack embodiment where the stacks 402 and 404 are coupled in series.

Details of Secondary Display Deployment Sensing

Ideally two binary sensors would be used. The first sensor would indicate that the secondary display is fully in its stowed position. The second sensor would indicate that the secondary display is in its fully deployed position. The two sensors would indicate one of four states: (a) the secondary display is fully stowed; (b) the secondary display is being moved from stowed to deployed or deployed to be stowed; (c) the secondary display is in the fully deployed position; (d) there is a mechanical problem with one or both of the sensors. State (b) maybe further resolved into (b1) the display was most recently in the (a) stowed state, therefore it is assumed the secondary display is being moved from stowed to deployed, and (b2) the display was most recently in the (c) deployed state, therefore it is assumed the secondary display is being moved from deployed to stowed.

The four states, or five states, counting (b1) and (b2) as distinct are used to power-up or power-down the secondary display; and to launch or close the secondary application; and to inform the primary application of the status of the secondary display.

A usable although less desirable sensing arrangement is to use a single binary sensor. In this case the single sensor might indicate any of the three mechanical positions of the secondary display identified above as states (a), (b), or (c). The sensor state, possibly in conjunction with other device state information, would produce a single binary state being either (e) the secondary display is stowed or close to stowed, or (g) the secondary display is deployed or close to deployed.

It is also possible to use one or more analog or multimodal digital sensors to determine the location of the secondary display on the path between stowed and deployed. A wide variety of possible analog sensors for this purpose exist, including linear potentiometers, a strain-gauge, a piezoelectric transducer (PZT), hall-effect devices, sonic-transducers, optical sensors, or even temperature sensors. Multi-mode digital sensors include coding wheels or linear position or pulse transducers.

However, the current state of technology indicates that simple binary sensors, such as mechanical, electrical or magnetic switches are simpler and lower cost.

It is possible to implement many of the advantages of this invention with no sensor on the position of the secondary display at all. In this case the position of the secondary display must be provided by user input, or deduced from other information. For example, if the device has been just powered up, it may be appropriate to assume the secondary display is stowed. If the user has selected an item in such a way on the primary display that indicates a desire for additional information, then it may be appropriate to assume that the secondary display is deployed, or is about to be deployed.

If the secondary display incorporates some type of input sensor, such as a touch screen, then information from this sensor may be used to deduce the state of the secondary display.

Finally, a dedicated button or switch (including a virtual button or switch) may be used for the user to directly indicate "power," "deploy," "activate," "launch," or similarly indicate the desire to start using or stop using the secondary display.

GUI System Integration

With the proper integration of this new hardware with existing graphical user interface (GUI) software systems, current mobile devices can easily utilize the new hardware capability without requiring changes to be made in existing software applications.

Current GUI systems for mobile devices are quite different from the GUI systems for desktop computers, because the displays on desktop computers are so large that they can easily support multiple windows, and allow the user to control the size and position of these windows.

On mobile devices, the displays are so small, that the GUI systems do not support multiple window systems. Instead, mobile devices implement the concept of a stack of screens or windows. The GUI system allows a new screen to be created by an application in such a way that it replaces the current screen, while keeping the state of the current screen in a stack. When the new screen is finally closed, it is "popped" off the stack to reveal the original screen "beneath" it.

Default Utilization of Displays

Figure 4:
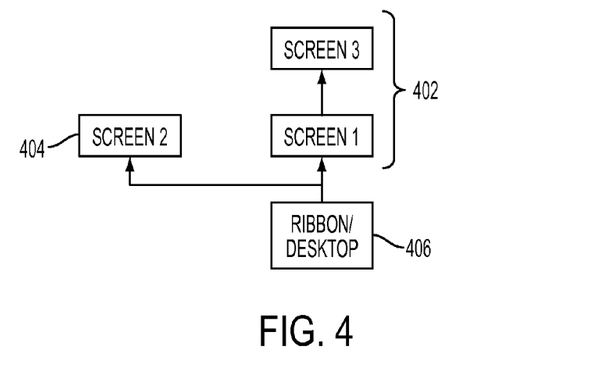
FIG. 4 illustrates a portable device that includes two display stacks. As is seen two display stacks (screen 1 and screen 2) and (screen 3) are directly coupled to the ribbon/desktop.

FIG. 4 illustrates a portable device 400 that includes two display stacks 402 and 404. As is seen two display stacks 402 and 404 (screen 1 and screen 2) and (screen 3) are directly coupled to the ribbon/desktop 406.

Figure 5A:
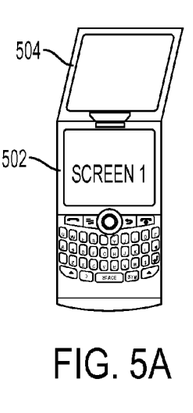
FIGS. 5A-5D illustrates two display stacks in action.
Figure 5B:
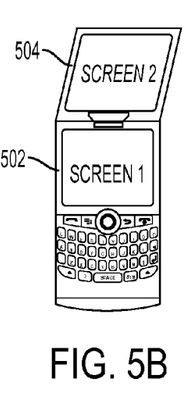
Figure 5C:
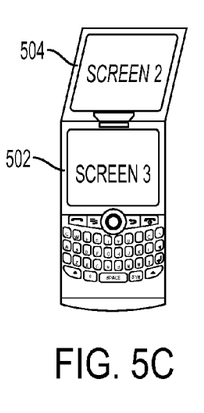
Figure 5D:
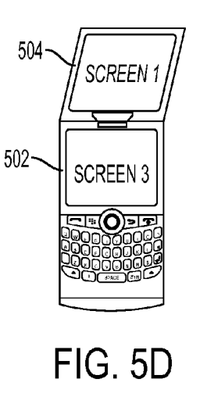

FIGS. 5A-5D illustrates the two display stacks 402 and 404 in action. In FIG. 5A, a first application is opened and shown on the first display 502 and the ribbon/desktop is shown on the second display 504. In FIG. 5B, a second application is opened. As is shown, the first application is remain shown on the first display 504 using a newly created stack for the second display 506. In FIG. 5C, a new screen is opened by the first application and placed onto the first display stack. The second application is shown on the second display 506 and the new screen from the first application is shown on the first display 504. In FIG. 5D, the second application is closed and the screen 1 from the first display stack is visible on the display 506.

Given such a system, it would be easy for the operating system to cause existing software applications to immediately take advantage of a second display, without modifying the software applications, by simply using the two displays to show the top two screens on the stack instead of only the top screen. This could be done in one of two ways: 1) by opening a new screen on the second display (assuming the second display was deployed), or 2) by opening the new screen on the first display and moving the previous screen onto the second display. It would be easy to allow the user to choose between these two default behaviors in the "preferences" settings for the mobile or portable device.

If two screens from the single screen stack are being displayed on the two displays, and the user stows the second display, then regardless of which screen was being displayed on the main display, the top screen of the screen stack would now be shown on the first display.

Once the second display has been deployed, however, it would be possible for the GUI system to support a second screen stack. Each time an application is opened from the "ribbon" or "desktop", This is referred to as starting a screen stack. Once one application is open and using one of the displays, the "ribbon" or "desktop" is still being shown on the other display, as shown in FIG. 5A. If the ribbon on the second display is used to open a second application, then the second application will be given its own screen stack as shown in FIGS. 4 and 5B. If another screen is opened from within the first application, the second application continues to be shown on the second display, and the second screen from the first application ("screen 3" in the Figures) is shown on the main display as in FIG. 5C.

If the second application is closed, the second display stack could be destroyed, causing both screens from the first application to be shown on the two displays, as shown in FIG. 5D, as would have happened if the second screen had been opened in the first application before opening the second application. With this behavior, "screen 3" from our first application would have to be closed before the ribbon on the second display could be observed. This default behavior simultaneously allows one application to utilize both displays at once, but also allows the user to use the two displays for two different applications at once.

An anomalous situation arises if two screen stacks have been created while the second display was deployed, but then the user stows the second display. In this case, the entire second screen stack of FIG. 5C should be put on top of the main screen stack of FIG. 6, but a method invoked indicating that the display on which this screen was displayed has been stowed. The default handler for this method will invoke the "Close" method, allowing software applications that are unaware of the existence of the second screen to continue to operate reasonably. If any dialog boxes arise when the screens are being closed, these dialog boxes will now appear on the main display. Once that application has been closed, then the primary screen stack will reappear on the main display, in the state it had when the optional screen was stowed.

Dialog Boxes

The limited windowing systems of mobile devices usually include support for dialog boxes. It would be possible to view dialog boxes as being suitable for placement on the second screen, but most applications will prefer to keep dialog box behavior as it exists now. Some mobile device manufacturers might want to provide default dialog box behavior in which a dialog box is considered to be just like a screen that goes on the screen stack unless only one screen is deployed. Most manufacturers will prefer to keep default behavior of dialog boxes as they are now, without making additional use of a second optional display. Application software might want to be able to specify a dialog box that is treated like a separate screen on the screen stack if the second screen is deployed, but using current dialog box behavior when there is only one screen deployed.

Input Focus Switching

If there are two active applications, then the issue arises of how input can be directed to each of the two applications. This will naturally be handled in one of three different ways, depending on the nature of the input devices used for pointing to items on the screen.

If the two displays are touch sensitive, then the method of pointing to items on the display is by touching the display. In this case, the hardware distinguishes between pointing input to the two displays directly. The remaining issue of focus is to which application keyboard input should be directed. At any moment in time, all input actions will be directed to one of the two active applications at the top of the two GUI stacks. One of the displays will be "active" since it has the focus of the keyboard. The operating system should detect touches on the inactive display, and should use this to switch the input focus to the application associated with that display.

If there is a pointing device such as a track wheel or mouse pad, then a different means of switching input focus must be used. In this case, one of three techniques may be used:
a) the mouse may be moved off of one display and onto the other if the pointer is moved in the direction of the other screen. Although this is the traditional method of focus transfer on desktop computers, this is likely to be less useful than the other techniques,
b) a menu command should exist on one of the menus of each screen that specifies that the input should be switched to the other screen; this menu item should not appear or be grayed out if both displays have not been deployed,
c) a keyboard shortcut will exist for the menu command specified in the last alternative; this keyboard shortcut can be invoked by typing it on the keyboard, and switching the focus of all input to the other display.

If there is no pointing device at all, but just a trackwheel, then the operating system will provide an additional command on the menu invoked by the track wheel whenever both displays are deployed that cause input focus to switch to the other display. In addition, a keyboard shortcut may be available to invoke this focus switch command.

If the two displays are voice sensitive then the method of selection for the user is through spoken interaction by microphone. The issue of menu corrdination is a discrete point and one of several options in selection of the applications including speech recognition, keyboard and pointing device manipulated through a switching device. Timing one of the two active applications at the top of the two GUI stacks with one display "active" as the verbally selected interface is onoing, specifying which display is the focus of the input devices. The input focus will be determined by the operating system to switch to the application associated with the selected display.

Programmed Utilization of Displays

Once mobile devices have been made available that have an interesting default utilization for the second optional display, applications software developers will want to take greater control of the utilization of the displays, but in such a way that the application works well whether the second display is deployed or not and continues to work well if the second display is deployed or stowed during execution of the application. Each graphical user interface system will have slightly different changes that will need to be made in order to allow applications running in these GUI systems to do this. The key way of providing application control to the second display, when deployed for example, in a BlackBerry GUI system is by providing additional styles for the Screen constructor.

By default, the new screen should be created on the current screen stack, and utilize the default handling of which display it should be shown on. A new value is: SAME_DISPLAY, which specifies that the new screen should be put on the current screen stack, but it should be shown on the current display, and the previous screen switched to the other display, if it is available.

Another value is: ALTERNATE_DISPLAY, which specifies that the new screen should be put on the current screen stack, but displayed on the alternate screen from the previous screen, if it is available. Another value is: HIDE_CURRENT, which specifies that the new screen should be put on the current screen stack, but the current screen should be hidden, and the current screen used to display the new screen instead.

Thus the contents of the alternate display would not change. If it was displaying a screen deeper in the stack, it would continue showing the same display. Once the new screen is popped off the stack, then the current screen will be displayed again, but again without altering the contents of the alternate display.

In order to create a new stack, a new constructor for UiApplication is provided: getOptionalUiApplication. This constructs a new screen stack, if the second optional display is deployed. Once created, screens can be pushed onto this stack. If no screens have been pushed onto this stack, then the operating system is free to put a screen from a different application (or the next screen in our display stack) onto the optional display. If the optional display is stowed, all of the screens on this stack are pushed onto the main stack for the application.

In order to ensure that the user remains in control of their mobile device, it would be wise for the operating system to provide an access control rule for each application that can be set by the user of the device that specifies whether an exception will be thrown by the getOptionalUiApplication operation if another screen stack already exists. Some applications may ask for user input as to whether the application should occupy both displays even if another application is already using the other display.

Javax Microedition Enhancements

The previous section refers to graphical user interface systems that are more advanced than Javax Microedition. For mobile devices that offer software support at this level, only one enhancement is needed to this interface to provide access to the second optional display. In Javax Microedition, there are no concepts of display stacks, so the discussion above is not very helpful.

Instead, each application (or midlet, using the terminology of Javax Microedition), has a Display object. The operating system can deploy these Display objects to the two screens in whatever way would be appropriate. In Javax Microedition, there is the greatest desire to minimize changes to the software interface, and to maximize default behavior with regard to the second optional display, since much of this software is portable software that can run on a large number of difference mobile devices.

By adding a single additional static method to the Display class, adequate control of the second optional display can be given to application software.

static Display getOptionalDisplay(MIDlet m)—Gets the Optional Display object that is unique to this MIDlet. If the second optional display is not deployed, then this optional display object is not displayed at all. If the second optional display is deployed, then the screen either contains the current main display of the previously executing MIDlet, or it contains the current display that has been placed on the optional display of the currently running MIDlet.

When the optional display is stowed, this optional Display object is no longer displayed, and its CommandListener will no longer receive commands.

RIM Enhancements

The windowing system provided by Research In Motion for BlackBerry devices has the more sophisticated features of a stack of screens as discussed at length above. We will specify specific enhancements to the net.rim.device.api classes that would be needed to allow application software written for these classes to be able to have access to the non-default application control of the second alternate display described in the larger discussion above.

First we have an additional method in the net.rim.device.api.ui.UiApplication class:

UiApplication getOptionalUiApplication( )

If the second optional display is deployed, creates a second display stack for the current application. This is actually a constructor method that should be invoked from a related constructor in the application's UI subclass.

Throws:

net.rim.device.api.system.ApplicationManagerException

If this application is not allowed to use the second optional display, or the display is not currently deployed, or an optional UiApplication has already been created for this Application.

There are some additional style bits specified for the net.rim.device.api.ui.Screen class:

static long SAME_DISPLAY

If specified, then when this screen stack is using the second optional display as well as a primary display, this screen will be shown on the same display as the currently active screen, and the currently active screen will be moved to the second optional display.

static long ALTERNATE_DISPLAY

If specified, then when this screen stack is using the second optional display as well as a primary display, the currently active screen will remain on its display and the new screen will be placed on the alternate display.

static long HIDE_CURRENT

If specified, then even if this screen stack is using the second optional display as well as a primary display, the currently active screen will disappear, and be replaced by this screen. When this screen is finally popped off the stack, then the underlying screen will come back onto the display by using the same display as the screen that was popped off.

Determining Deployment Status

If application software successfully creates an optional UiApplication, then the application software knows that the second optional display has been deployed. Each time a screen is constructed for the optional UiApplication, this indicates that the second optional display is still deployed. If the optional display is stowed, all of the screens that should be displayed on this display are moved onto the end of the main screen stack for the application, presumably so they can be closed. This provides the most frequently needed sensing about the deployment status of the second display. If greater control is needed over this, then there are two reasonable enhancements to the net.rim.device.api.system: one is to merely add a few static int fields to the Sensor class, and the other is to create a class very much like the Sensor class, possibly using the same SensorListener class used by the Sensor, with the new static int fields defined for this new class instead.

static int OPTIONAL_DISPLAY

Sensor ID of the second optional display sensor.

static int STATE_OPTIONAL_DISPLAY_DEPLOYED

A state of the optional display sensor that indicates the display is deployed.

static int STATE_OPTIONAL_DISPLAY_STOWED

A state of the optional display sensor that indicates the display is stowed.

Applications

A key aspect of this invention is that the secondary display provides additional details about an item selected in the primary display. Thus, although two separate applications (or two different views of information from one application) are running, one for each display, and the two sets of information are linked, at least initially, in a useful way.

The list of examples below is by no means meant to be comprehensive or to restrict the scope of the patent to these applications.

For every example below, the roles of the primary and secondary displays swap position if the item selected happens to be on the secondary display. In this case, a new window opens on the primary display, covering the existing window. In the ideal case, the information covered is not lost, and shows again when the overlying window is closed. However, in the use of this invention such preservation of the information in the primary display is not required.

(1) In a list of emails, or one email, select an attachment to view the attachment on the secondary display.

(2) In a list of emails, or one email, select a link to a web page to view the web page on the secondary display.

(3) In a list of emails, or one email, select a name to view information about that individual from your contact data on the secondary display.

(4) In a view of text, select a word or phrase to view more information about that word or phrase on the secondary display. This additional information may be (a) from a dictionary, (b) from a web search, (c) from a search of data on your device or computer, (d) from a search of recent activity, (e) from a help database, which might be local or remote.

(5) In a view of text, select the name of an individual to display information about that individual from the user's contacts data on the secondary display.
(6) In a view of text, select a name of an individual to display a photograph of that individual on the secondary display.
(7) In a list of emails, or one email, select an action, such as reply, save, forward or mark, to open a window appropriate to complete that action on the secondary display.
(8) While viewing a web page, select a link on that web page to open the selected web page on the secondary display.
(9) While viewing a web page, select a thumbnail image to view a larger image on the secondary display.
(10) While viewing a web page, select a block of text or area to view a larger image (larger font and/or magnified view) of the selected text or area on the secondary display.
(11) While viewing a map, select a point or area on the map to view a magnified view of that point or area on the secondary display.
(12) While viewing a map, select a point or area on the map to view directions to that point or area on the secondary display.
(13) While viewing a map, select a point or area on the map to view a choice of services available near that point or area on the secondary display.
(14) While viewing a map, select a point or area on the map to view a list of transportation options to or from that point or area on the secondary display. These transportation options may come from a web search, from stored data or recent activity on the device, from personal preferences or from other sources.
(15) While viewing a map, select a point or area on the map to view a satellite or street-level photograph of that point or area on the secondary display.
(16) In a view of text, or an advertisement for a product, select the name of the product or the ad for the product to display information on how to buy the product in the secondary display.
(17) In a view of text, or an advertisement for an event, select the name of the event or the ad to display information on how to buy tickets for the event in the secondary display.
(18) In a view related to an incoming or outgoing phone call, email, text message, video message, or Instant Message, information about the person on the other end of the phone call, email, text message, video message or Instant Message appears on the secondary display.
(19) In a view related to an incoming or outgoing phone call, email, text message, video message, or Instant Message, information managing the phone call, email, text message, video message or Instant Message appears on the secondary display. Such information may include billing information, saving or archiving options, recording or deleting options, privacy or encryption options, information about similar messages, or other information.
(20) In a view related to purchasing a product or service, a window opens up on the secondary display related to payment details.
(21) In a view that contains a company name or stock-trading symbol, selecting the name or stock-trading symbol brings up current information about the stock of that company in the secondary display.
(22) In a view that contains a company name or stock-trading symbol, selecting the name or stock-trading symbol brings up current information about the user's holdings of stock in that company in the secondary display.
(23) In a view that contains a company name or stock-trading symbol, selecting the name or stock-trading symbol brings up a window permitting purchasing or selling the stock of that company in the secondary display.
(24) In a view that contains an image, selecting a point or region in the image brings up a magnified view including the point or region of the image in the secondary display.
(25) In a view containing a video or moving image, selecting the moving image brings up a stored, still view of the video or moving image at the time the user selected it, in the secondary display. A variation of this feature is to display a view slightly earlier in time than the time the user selected the moving image, so as to attempt to show the still view of the video at the moment the user decided he or she wished to see or save a still image.
(26) In a view containing information about an audio or video track being played on the device, selecting an appropriate element or elements in the primary display causes additional information or options about the audio or video track being played to show in the secondary display. For example, if a video is being played on the primary display, the secondary display might show a volume control. As another example, if an audio track is being played, selecting the name of the artist might bring up an image of the artists, or other tracks or albums or event by that artist in the secondary display.

Although the present invention has been described in accordance with the embodiments shown, one of ordinary skill in the art will readily recognize that there could be variations to the embodiments and those variations would be within the spirit and scope of the present invention.

What is claimed is:

1. A portable device comprising:
  a primary display and a secondary display; wherein the secondary display is integrated with the portable device;
  the secondary display is physically protected when stowed;
  the secondary display runs a second application, while the primary display runs a first application in at least one of a plurality operating modes;
  wherein the primary display and the secondary display are both visible at the same time by the user of the device during the at least one of a plurality of operating modes;
  wherein the act of deploying the secondary display causes a second software application to launch, and the second software application displays a graphical user interface on the deployed secondary display
  wherein a second screen display stack is created when the secondary display is deployed, and the graphical user interface for the second software application creates a first screen displayed on the secondary display using in the second screen stack;
  wherein as subsequent applications are opened on the secondary display following the first application, the subsequent applications are added to the second screen display stack and displayed on the secondary display.

2. The portable device of claim 1 wherein the plurality of operating modes of the device include:
  (a) both displays off,
  (b) only primary display on,
  (c) both primary and secondary display on; wherein the secondary display is generally out of sight, or stowed, in said operating modes (a) and (b).

3. The portable device of claim 2 wherein:
  the secondary display is mechanically moved from said stowed position to a deployed position at the initiation of the operator of the device, in order to initiate operating mode (c).

4. The portable device of claim 2 wherein:

the secondary display is moved from said stowed position to a deployed position by a manual mechanical motion of the operator of the device, in order to initiate operating mode (c).

5. The portable device of claim 1 wherein:

the secondary display is moved via a folding mechanism.

6. The portable device of claim 1 wherein:

the secondary display is moved via a sliding mechanism.

7. The portable device of claim 1 wherein:

the secondary display is moved via a rotating mechanism.

8. The portable device of claim 1 wherein:

the secondary display is approximately the same size as the said primary display.

9. The device of claim 1 wherein:

the secondary display is approximately coplanar with the primary display when deployed.

10. The portable device of claim 1 wherein:

the act of deploying the secondary displays causes the second software application to launch, using the secondary display as the graphical user interface for the second software application, and not disrupting the appearance of a first application running on the said primary display; and the second application is determined by the first application.

11. The portable device of claim 10 wherein:

the second application contains user instructions, a user manual, or help screens for the first application.

12. The portable device of claim 10 wherein:

the first application is an email program; and the second application displays an attachment to an email selected in the primary display.

13. The portable device of claim 10 wherein:

the first application displays a link in the world wide web (www); and the second application displays the target of said link.

14. The portable device of claim 10 wherein:

the first application displays the name, location, email address, phone number, image, advertisement or other identifying information about an individual, address, event, company or product; and the second application displays additional information about said individual, address, event, company or product.

15. The portable device of claim 10 wherein:

the first application displays information about an event, company or product; and the second application displays information regarding the purchase of ticket(s) for the said event, or information regarding the purchase of product(s) s from the company, or information regarding the purchase of the said product.

16. The portable device of claim 10 wherein:

the first application displays the name, location, email address, phone number, image, advertisement or other identifying information about an individual, address, event, company or product; and the second application displays information about the location of said individual, address, event, company or nearby product.

17. The portable device of claim 1 wherein:

the act of deploying the secondary displays causes the second software application to launch, using the secondary display as the graphical user interface for the second application, and not disrupting the first application running on the primary display; and content of the graphical user interface displayed by the second application is determined by information displayed by the first application on the primary display.

18. The portable device of claim 1 wherein:

when the user of the device selects or identifies via an action a piece of information in the primary display that action causes the secondary display to provide additional or more detailed information about piece of information, without disrupting the information in the primary display.

19. The portable device of claim 18 wherein:

when the user of the device selects or identifies via an action a piece of information in the secondary display that the action causes the primary display to provide additional or more detailed information about the piece of information, without disturbing the information in the secondary display.

20. The portable device of claim 1 wherein:

when new information arrives at or in the device, such as an email, an instant message, a text message, a phone call, or an error, that details about said new information display on the secondary display, without disturbing the information in the primary display.

* * * * *

UNITED STATES PATENT AND TRADEMARK OFFICE
CERTIFICATE OF CORRECTION

PATENT NO. : 9,864,401 B2
APPLICATION NO. : 14/589853
DATED : January 9, 2018
INVENTOR(S) : Ebey et al.

It is certified that error appears in the above-identified patent and that said Letters Patent is hereby corrected as shown below:

In the Specification

In Column 1, Line 55, after "U.S." insert -- Pat. No. --.

In Column 1, Line 58, delete "41,159,417" and insert -- 4,159,417 --, therefor.

In Column 8, Line 54, delete "FIG. 2d" and insert -- FIG. 2c --, therefor.

In Column 10, Line 17, delete "506" and insert -- 504 --, therefor.

In Column 10, Line 20, delete "506" and insert -- 504 --, therefor.

In Column 10, Line 23, delete "506" and insert -- 504 --, therefor.

In Column 12, Line 6, delete "corrdination" and insert -- coordination --, therefor.

In Column 12, Line 12, delete "onoing," and insert -- ongoing, --, therefor.

In Column 13, Line 12, delete "midlet," and insert -- MIDlet, --, therefor.

In the Claims

In Column 16, in Claim 1, Line 46, after "display" insert -- ; --.

In Column 16, in Claim 1, Line 50, delete "using".

In Column 16, in Claim 1, Line 51, after "screen" insert -- display --.

In Column 16, in Claim 1, Line 53, after "application," insert -- screens for --.

Signed and Sealed this
Ninth Day of October, 2018

Andrei Iancu
*Director of the United States Patent and Trademark Office*

CERTIFICATE OF CORRECTION (continued)
U.S. Pat. No. 9,864,401 B2

In Column 17, in Claim 9, Line 16, after "The" insert -- portable --.

In Column 17, in Claim 10, Line 20, delete "displays" and insert -- display --, therefor.

In Column 18, in Claim 15, Line 6, after "product(s)" delete "s".

In Column 18, in Claim 17, Line 16, delete "displays" and insert -- display --, therefor.

In Column 18, in Claim 18, Line 28, after "about" insert -- the --.

In Column 18, in Claim 20, Line 42, delete "display on" and insert -- is displayed on --, therefor.